April 18, 1961     R. S. COFFMAN     2,980,286
SAFETY PRESSURE RELIEF DEVICE SUPPORT Filed Oct. 8, 1956     2 Sheets-Sheet 1

ROBERT S. COFFMAN
*INVENTOR.*

BY
ATTORNEY

April 18, 1961 R. S. COFFMAN 2,980,286
SAFETY PRESSURE RELIEF DEVICE SUPPORT
Filed Oct. 8, 1956 2 Sheets-Sheet 2

ROBERT S. COFFMAN
*INVENTOR.*

BY
ATTORNEY

United States Patent Office 2,980,286
Patented Apr. 18, 1961

2,980,286

SAFETY PRESSURE RELIEF DEVICE SUPPORT

Robert S. Coffman, Kansas City, Mo., assignor to Black, Sivalls & Bryson, Inc., Kansas City, Mo., a corporation of Delaware Filed Oct. 8, 1956, Ser. No. 614,610

7 Claims. (Cl. 220—89)

The present invention relates generally to a safety pressure relief device and more specifically to a support for a dome-shaped rupturable disc-type safety pressure relief device.

A majority of the rupturable disc-type safety pressure relief devices presently being used are dome-shaped. If they are not pre-bulged prior to being put into service, they will assume a dome shape immediately upon being exposed to pressure. Therefore, it has been found to be more expedient to pre-bulge the rupturable discs to a dome shape which has a higher crown height than the rupturable disc would have when exposed to service condition pressures. The advantage of this pre-bulging is that the crown height of the rupturable disc is then known for all normal service pressures and that this dome-shaped rupture disc may be provided with adequate support since its dome shape and crown height are known prior to installation.

Supports are needed under a dome-shaped rupture disc if it is ever to be subject to pressure differentials across the disc whereby the higher pressure is exerted on the convex side of the disc. This condition often occurs in pressure systems that are subject to conditions of vacuum, that is, pressure less than atmospheric. Such supports are generally given the designation, vacuum supports. Vacuum supports should be designed with two basic requirements in mind. First, the supports should be sufficiently strong to protect the rupture disc at all possible vacuums which may occur. Second, the supports should be sufficiently weak to completely open so that the relief area will not be obstructed by the support once the rupture disc has failed. Prior to the present invention, vacuum supports generally were dome-shaped members positioned under dome-shaped rupture discs. Many of these previous designs have provided sufficient support under conditions of vacuum but have failed to open to clear the relief area when the rupture disc bursts. This failure to open may be due to excessive strength of the support device or it may in some types be caused by cohesion of the parts of the device due to corrosive conditions to which the support has been exposed. Some of the previous types of vacuum supports have been known to fail to adequately open when the rupture disc fails and thus have obstructed the relieving of the pressure in the vessel or system being protected. Also, in the use of some of the previous types of vacuum supports, the vapors of the system being protected have been known to solidify in the space between the supports and the rupture disc. This can cause a gradual build-up of solids which may eventually cause a premature failure of the rupture disc.

Most previous types of vacuum supports for dome-shaped rupture members have been dome-shaped and positioned under the dome-shaped rupture member. This often is a disadvantage since both the vacuum support and the rupture disc will be exposed to the vapors within the system being protected. This may require that both units, the vacuum support and the rupture disc, be made of a corrosion-resistant material. Another disadvantageous feature of previous vacuum support design is their complexity of design. Therefore, the primary object of the present invention is to provide a new and novel vacuum support for dome-shaped rupturable disc-type safety pressure relief devices.

A further object of the present invention is to provide a vacuum support for a dome-shaped rupture disc which will be protected from corrosive conditions by the rupture disc.

A still further object of the present invention is to provide a novel vacuum support for a dome-shaped rupture disc which will be positioned on the convex side of the rupture disc.

Another object of the present invention is to provide a vacuum support for a dome-shaped rupture disc which may be positioned in such a manner that a deposit of solids between the support member and the disc is effectively prevented.

Still another object of the present invention is to provide a novel vacuum support for a dome-shaped rupture disc which will provide adequate support for the rupture disc under conditions of reversed pressure differential and which will open upon failure of the rupture disc to allow normal pressure relief of the system being protected.

In accomplishing these and other objects of the present invention, I have provided improved details of structure, the preferred form of which is illustrated in accompanying drawings wherein.

Figure 1:
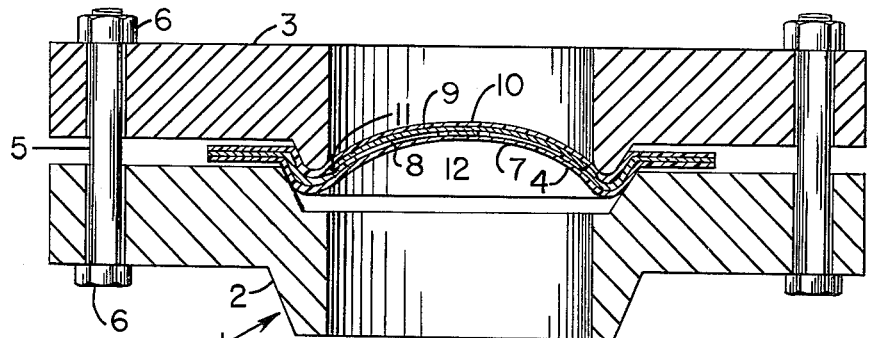
Fig. 1 is a sectional view of a safety pressure relief device including the novel vacuum support of the present invention.
Figure 3:
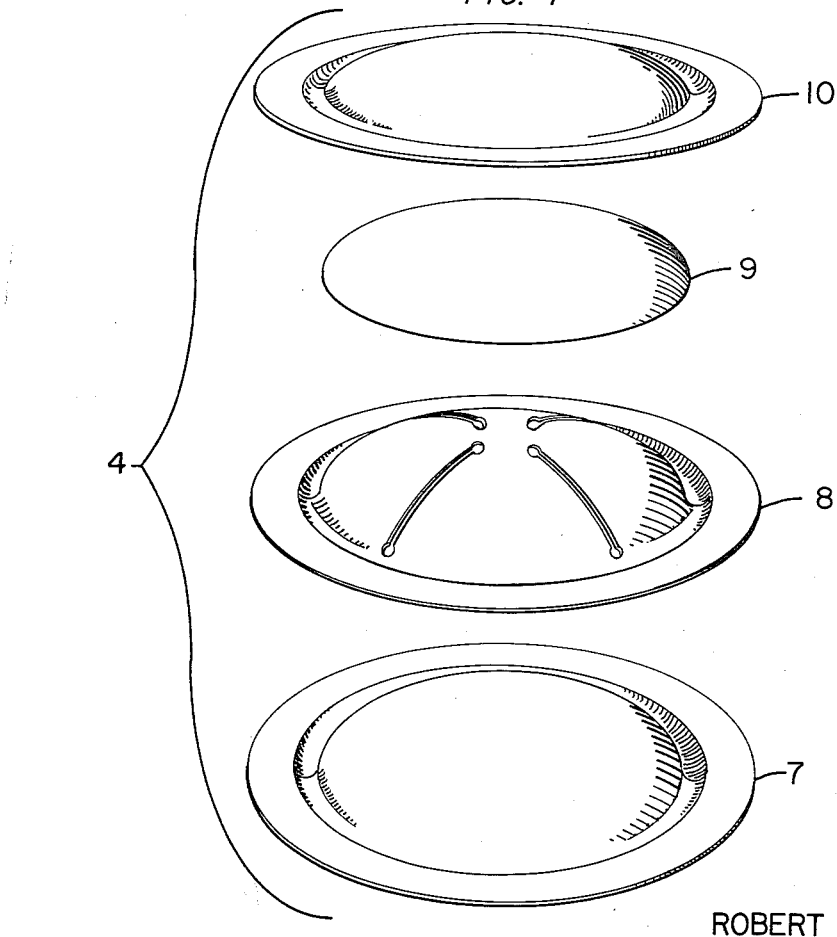
Fig. 3 illustrates the component parts forming the rupture assembly illustrated in Fig. 1, such parts being shown in disassembled spaced relationship.

Referring more in detail to the drawings:

Safety pressure relief device 1 shown in Figs. 1 and 3 is composed of base flange 2, holddown flange 3, rupture assembly 4 positioned between flanges 2 and 3, studs 5 and nuts 6 on studs 5 securing flanges 2 and 3 together.

Rupture assembly 4 is composed of a lower sealing member 7, a slotted rupture member 8, support member 9 and an upper sealing member 10. It should be noted that the design of lower sealing member 7 and slotted rupture member 8 generally conforms to the specification of my co-pending application Serial No. 455,333, filed on September 10, 1954.

Upper and lower sealing members 10 and 7 are generally made of a resilient, corrosion-resistant material such as polyethylene. It has been found that relatively thin metal can be formed to function properly as a sealing member in rupture assembly 4, but in general the resilient plastic-type material has been found best suited for this structure.

Support member 9 is spot welded as shown at 11 to rupture member 8 at only one position near its outer periphery. Since support member 9 is a solid concave-convex disc and is spot welded at one side only, it will fold upwardly when rupture member 8 ruptures to allow a complete opening of relief area 12, the area through flange 3. Support member 9 is formed to have a dished contour approximately the contour of rupture member 8, Sealing members 7 and 10 are either formed or positioned in assembly 4 so that a minimum amount of air is trapped between these two members. Also, members 7 and 10 should be comparatively weak in strength so that they will not appreciably affect the rupture pressure of rupture member 8. In designing such units, it is desirable to take into consideration the strength added by members 7 and 10 when calculating the rupture pressure of the complete rupture assembly 4.

Figure 2:
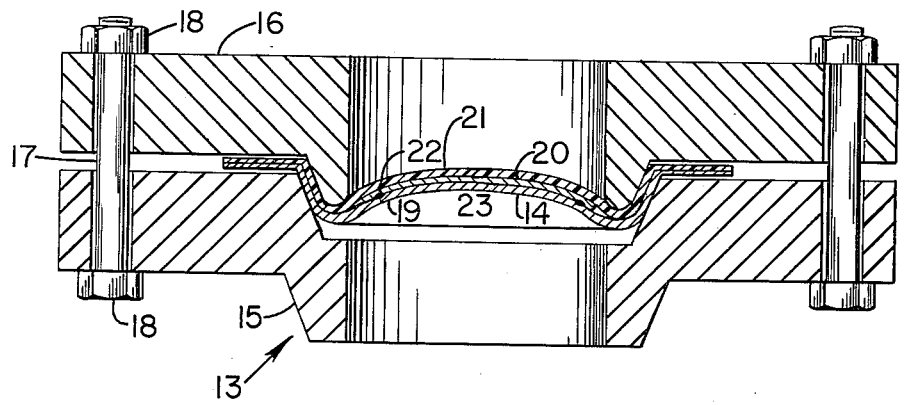
Fig. 2 is a sectional view of another type of safety pressure relief device which also includes the novel vacuum support of the present invention.
Figure 4:
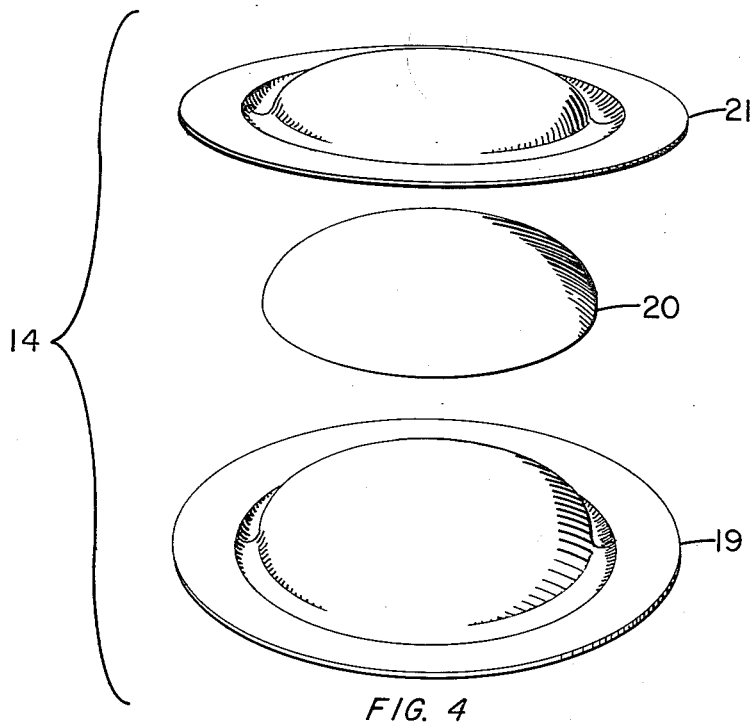
Fig. 4 illustrates the component parts forming the rupture assembly illustrated in Fig. 2, such parts also being shown in disassembled spaced relationship.

Safety pressure relief device 13 shown in Figs. 2 and 4 illustrates the use of the support of the present invention in combination with a standard dome-shaped rupture disc. Rupture assembly 14 is positioned between base flange 15 and holddown flange 16, the flanges 15 and 16 being secured together by studs 17 and nuts 18.

Rupture assembly 14 comprises a lower dome-shaped rupture disc 19, support member 20 and upper sealing member 21. Dome-shaped rupture disc 19 will normally be of a metallic material such as aluminum or steel to which support member 20 may be spot welded as shown at 22. As previously discussed, support member 20 is secured by spot welding at only one place in order to allow a complete opening of the relief area 23 through holddown flange 16 when rupture disc 19 fails. Sealing member 21 will normally be made of a resilient material such as polyethylene but may be formed of other materials which will block the flow of external air into the space between rupture disc 19 and support member 20. Sealing member 21, like sealing member 10, is comparatively weak in strength so that it will not appreciably affect the rupture pressure of rupture disc 19.

In operation, safety pressure relief device 1 shown in Fig. 1 is installed into a system by welding or otherwise suitably connecting base flange 2 to a pipe connecting into the pressure system which is to be protected. Once installed, pressure is exerted through base flange 2 against lower sealing member 7. This will cause member 7 to completely engage and transmit the system pressure against slotted rupture member 8. Since the crown height of member 8 is predetermined, it will retain its height and shape at all system pressures prior to rupture. Support member 9 may be domed to match the crown of slotted rupture member 8 and, when secured to rupture member 8, it will rest thereon giving a complete surface contact. Any vacuums (pressures less than atmospheric) which may occur in the system will be transmitted through upper sealing member 10 to support member 9. Support member 9, being of the same contour as slotted rupture member 8, will transmit the reverse pressure to the outermost periphery of contact between support member 9 and slotted rupture member 8 thereby preventing rupture member 8 from being reversely dished and consequently weakened. This position of support member 9 above slotted rupture member 8 may cause a slight flexing of slotted rupture member 8 near its outer periphery adjacent to the position where it is clamped between flanges 2 and 3, but this deflection will not be sufficient to cause a premature rupture of rupture assembly 4 since the weakest point of rupture assembly 4 is the space between the ends of the slots in slotted rupture member 8.

Thus, support member 9 will provide adequate support for slotted rupture member 8 and will allow the use of a sealing membrane (lower sealing member 7) below slotted rupture member 8 to protect rupture assembly 4 from any possible corrosive conditions existing in the protected system and also will protect against premature failure of rupture assembly 4 due to the deposit of solids on rupture member 4 from the protected system.

Safety pressure relief device 13 shown in Fig. 2 functions similarly to safety pressure relief device 1 shown in Fig. 1 except that dome-shaped rupture disc 19 is to be protected against vacuum and back pressures rather than slotted rupture member 8. Support 20 functions in an identical manner as support 9 functions in relation to slotted rupture member 8. Support 20 is welded to rupture disc 19 in one position to allow opening of relief area 23 when rupture disc 19 fails. Also, rupture disc 19 and support 20 are sufficiently domed so that they will not have any additional growth in crown height under normal operating conditions. Support member 20 provides support for rupture disc 19 by transmitting any back pressures to its outer periphery and to the portion of rupture disc 19 which is contacted at the outer periphery of support member 20. Since the central portion of rupture disc 19 is the weakest portion, it is completely protected against vacuums and back pressures. It is advisable to minimize the volume of air trapped between rupture disc 19 and upper sealing member 21 since, under conditions of vacuum within relief area 23, this trapped air will exert pressure on rupture disc 19 in such a manner that support 20 cannot provide support for rupture disc 19.

Therefore, from the foregoing it may readily be seen that I have provided a new and novel support device for rupturable disc-type safety pressure relief devices wherein said support device is protected by the rupture member from corrosive conditions and from any harmful deposit of solids. Also, my new and novel support device will provide adequate support for a rupturable disc and will open completely when the disc ruptures allowing complete pressure relief through the relief device.

What I claim and desire to secure by Letters Patent is:

1. A combination safety pressure relief device and vacuum support including, a rupture member having a central concave-convex portion, the concave side of said portion adapted to be exposed to pressures, two sealing membranes, said membranes positioned on both sides of said rupture member and a concave-convex support member positioned in nesting relationship with the convex side of said rupture member between said rupture member and one of said sealing members.

2. A safety pressure relief device comprising: a dome-shaped imperforate rupture disc adapted to rupture at a predetermined pressure, said rupture disc having its concave side normally exposed to pressures to be relieved and positioned across a pressure relief passageway to contain pressure therein, a dome-shaped vacuum support member positioned and closely fitting on the convex surface of said rupture disc, and a sealing member positioned on the convex side of said support member and providing a seal between the edge of the latter and said rupture disc, said sealing member being weaker than the said rupture disc so as to have no appreciable effect on the rupture characteristics of said pressure relief device.

3. Invention according to claim 2 wherein the outer diameter of said dome-shaped support member is smaller than the diameter of said pressure relief passageway.

4. Safety pressure relief apparatus comprising: a dome-shaped device adapted to rupture at a predetermined pressure and having a peripheral clamping flange, said device being adapted to be positioned across a pressure relief pasageway with its concave side exposed to the pressure to be relieved; a dome-shaped vacuum support member of a diameter less than that of said rupture device and positioned against the convex side of the latter; and a sealing membrane of a diameter greater than that of said support member positioned against the convex side of the latter, whereby under vacuum conditions substantially only the peripheral edge of said support member exerts a buckling force on said rupture device, said sealing membrane being weaker than said device so as to have no appreciable effect on the rupture characteristics of said apparatus.

5. The structure defined in claim 4, in which the support member is secured at a single side thereof to the rupture device.

6. The structure defined in claim 4, in which the rupture device comprises a single imperforate member.

7. The structure defined in claim 4, in which the rupture device comprises a slotted member and a sealing membrane positioned on the concave side of said slotted member.

References Cited in the file of this patent

UNITED STATES PATENTS

| | | |
|---|---|---|
| 2,123,662 | Raymond | July 12, 1938 |
| 2,523,068 | Simpson et al. | Sept. 19, 1950 |
| 2,548,744 | Simms | Apr. 10, 1951 |
| 2,694,503 | Young et al. | Nov. 16, 1954 |
| 2,716,506 | Fike | Aug. 30, 1955 |
| 2,758,749 | Jones | Aug. 14, 1956 |
| 2,766,904 | Philip | Oct. 16, 1956 |

FOREIGN PATENTS

| | | |
|---|---|---|
| 1,074,046 | France | Mar. 31, 1954 |